Patented May 24, 1949

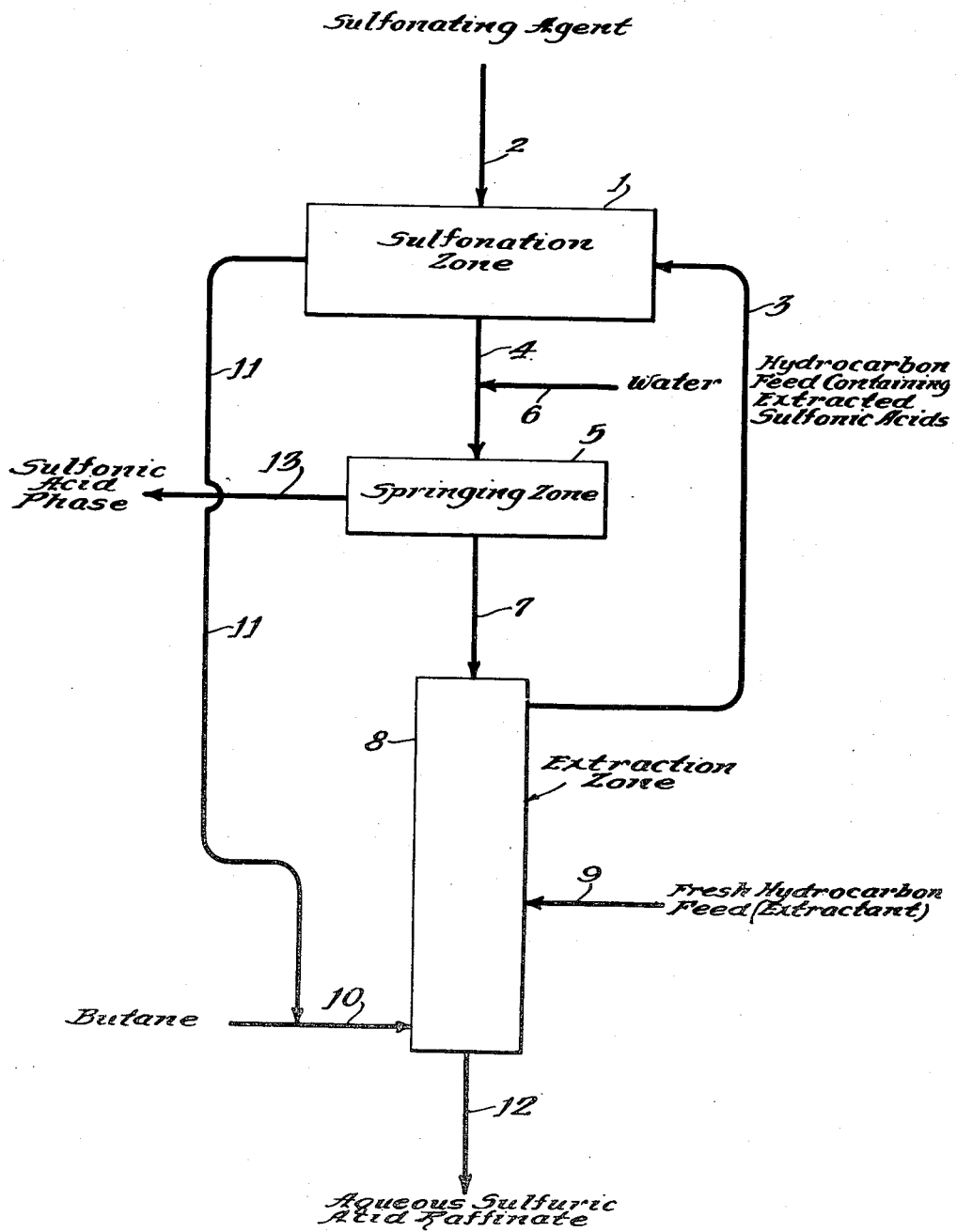

2,470,896

UNITED STATES PATENT OFFICE 2,470,896

RECOVERY OF SULFONIC ACIDS FROM SPENT SULFONATING AGENT

Julian M. Mavity, Hinsdale, Ill., assignor to Universal Oil Products Company, Chicago, Ill., a corporation of Delaware Application November 15, 1947, Serial No. 786,298

11 Claims. (Cl. 260—505)

This invention relates to a process for extracting a spent sulfonation acid effluent to recover the residual sulfonic acids contained therein which fail to separate therefrom when the spent sulfonation acid is diluted with water to effect a separation of a major proportion of the sulfonic acid product in a prior so-called "springing" stage of the process. More specifically the invention concerns a countercurrent liquid-liquid extraction procedure utilizing a hydrocarbon or halogenated hydrocarbon extractant to remove sulfonic acids from a dilute spent sulfuric acid effluent separated from the reaction mixture of a process for sulfonating an aromatic compound.

In the sulfonation of aromatic sulfonatable compounds, typical examples of which are such compounds as phenols, aromatic hydrocarbons, alkyl aromatic hydrocarbons, and their halogenated derivatives utilizing the usual sulfonating agents such as sulfuric acid, an oleum, sulfur trioxide, the sulfonyl halides, etc., and separating the desired sulfonic acid product from the excess sulfonating agent by dilution of the sulfonation reaction mixture with water to cause phase separation between the resulting diluted sulfonating agent and a predominately sulfonic acid product phase, it has been observed that the diluted sulfonating agent retains appreciable residual sulfonic acids which fail to separate in the dilution or springing step. The resulting problems associated with the retention of a portion of the sulfonic acid product by the spent acid phase has been recognized by the prior art although no specific treatment of the spent acid to recover the sulfonic acids contained therein has been advanced. Heretofore the spent acid was either discarded, together with the sulfonic acids present therein, or the dilute acid was subjected to distillation for the purpose of evaporating water therefrom to reconcentrate the sulfuric acid for recycling to the sulfonation stage of the process. In either case the sulfonic acids present in the spent acid were not recovered and since the amount of sulfonic acid product contained in the spent sulfuric acid phase is often as high as 3% of the original aromatic compound charged to the sulfonation process, the loss thereof represented an economically appreciable proportion of the total product. Moreover, when the dilute acid was subjected to a distillation or evaporation treatment to reconcentrate the same for recycling purposes, the residual sulfonic acids contained in the spent acid, in the first stages of the distillation, caused the dilute acid to foam, resulting in difficulties with respect to vapor carryover from the distillation still. In the later stages of the distillation, when the boiling point of the acid increased as the acid became more concentrated, the organic sulfur-containing compounds and sulfonic acids underwent decomposition at the distillation temperatures, forming sulfur dioxide and dark colored decomposition products which remained dissolved in the reconcentrated acid and caused undesirable discoloration of the sulfonic acid product when the recovered acid was subsequently utilized for further sulfonation. The present invention provides a method for recovering the residual sulfonic acids present in the dilute spent sulfuric acid phase by the application of an extraction procedure on the spent acid for removing and recovering the sulfonic acids therein, utilizing as extractive solvent a hydrocarbon or halogenated hydrocarbon liquid preferably in a countercurrent extraction procedure.

It is to be emphasized that the present separation process is applicable to any sulfonation reaction mixture in which a sulfonatable aromatic compound is utilized as charging stock, wherein a common sulfonating agent, such as sulfuric acid, an oleum, sulfur trioxide, a sulfonyl halide, etc. is utilized as the sulfonating agent, and wherein the excess reagent forms a homogeneous reaction mixture with the sulfonic acid product. When neutral salts of the sulfonic acid product are desired, the sulfonation reaction mixture may either be neutralized in its entirety, in which case the excess sulfonating agent also consumes caustic, or, alternatively, the desired sulfonic acid may be separated from the excess sulfonating agent by the method hereinabove referred to and known to the prior art as "springing" the sulfonic acid product from the homogeneous sulfonation reaction mixture by the addition of water thereto until phase separation occurs. The dilution or springing step, however, does not result in quantitative separation of sulfonic acids from the reaction mixture and a portion of the product is retained by the dilute spent sulfonating agent; it is the specific purpose of the present invention to recover the latter sulfonic acids retained in the dilute spent sulfonating agent by means of the present countercurrent liquid-liquid extraction process.

Another object to be achieved by the present process is to remove dissolved organic material present in spent sulfuric acid recovered from a sulfonation reaction mixture, thereby conditioning said spent acid for subsequent reconcentration of the same by distillation of water therefrom without the formation of undesirable decomposition products of the sulfonic acids normally present therein.

A further object of the invention is to effect an economy in the usual sulfonation process wherein excess sulfonating agent is removed from the sulfonation reaction mixture in a springing stage of the process by presenting a method for effecting the recovery of sulfonic acids retained by the dilute spent sulfonating agent.

In one of its embodiments this invention relates to an improved method for recovering residual sulfonic acids from a spent sulfonation acid by dilution of the sulfonation reaction mixture with water in a "springing" procedure until the separation of two phases, one of which contains dilute sulfonation acid and the other contains the sulfonic acid product, said improved method comprising contacting said dilute sulfonation acid with a liquid extractant capable of dissolving the residual sulfonic acids present in said sulfonation acid and selected from the group consisting of the hydrocarbons liquefiable at the conditions of extraction and their halogenated analogs to thereby form a two-phase liquid system, separating a raffinate phase from the resulting extract phase and recovering extracted sulfonic acids from said extract phase.

A more specific embodiment of this invention concerns the recovery of alkyl aromatic sulfonic acids from a dilute, spent sulfonation acid formed by diluting with water the reaction mixture resulting from the sulfonation of an alkyl aromatic hydrocarbon forming thereby said dilute acid phase and a sulfonic acid product phase, the recovery of the residual sulfonic acids retained by the dilute acid phase being effected by extracting said acid phase with a solvent selected from the group consisting of the hydrocarbons and halohydrocarbons liquefiable at the temperature and pressure conditions existing during the extraction, thereafter separating a raffinate dilute acid phase from the resulting extract phase and recovering said residual sulfonic acids extracted from the dilute spent acid phase from said extract phase.

Another more specific embodiment of the invention relates to a process for recovering residual sulfonic acids from the spent sulfuric acid phase separated from the sulfonation reaction mixture formed on sulfonating an alkyl aromatic hydrocarbon and subsequently diluting the sulfonation reaction mixture to cause phase separation between the spent sulfonating agent and sulfonic acid product, said process for recovering residual sulfonic acids being further characterized by a procedure which involves countercurrently extracting said spent sulfuric acid with the fresh hydrocarbon charge to the sulfonation reaction prior to said sulfonation, separating an extract phase containing said residual sulfonic acids present in the fresh hydrocarbon charge utilized as extractant, and thereafter contacting said extract phase comprising said fresh hydrocarbon charge containing dissolved residual sulfonic acids with the sulfonating agent to effect sulfonation of the alkyl aromatic hydrocarbons in said extract phase.

Other objects and embodiments of the present invention relating to specific methods of effecting the extraction and also relating to extraction conditions maintained during the procedure will be described in greater detail in the following further description of the invention.

The separation of the desired sulfonic acid product from the usually homogeneous or emulsified reaction mixture obtained on sulfonating sulfonatable aromatic compound is commonly effected by the so-called "springing" procedure in which water is introduced into the sulfonation reaction mixture until two phases are formed, one of which is an upper layer sulfonic acid phase containing a major proportion of the sulfonic acid product formed in the sulfonation reaction and the other of which is a lower dilute sulfuric acid phase ordinarily containing dissolved or entrained therein a small but nevertheless economically recoverable amount of sulfonic acid product, often amounting to as much as 3% of the original sulfonatable aromatic compound charged to the sulfonation reaction. The amount of water required for dilution to obtain phase separation or "springing" is dependent upon several factors, among which are the temperature of the mixture, the original concentration of the sulfonating agent, the type of sulfonatable aromatic compound charged to the sulfonation reaction and the ratio of sulfonating agent to charging stock in the reaction mixture. In order to obtain springing in most cases, sufficient water is added to the sulfonation reaction mixture to reduce the concentration of sulfuric acid in the dilute acid phase formed as a result of the springing to approximately 90% sulfuric acid by weight or lower, down to about 60% sulfuric acid. The temperature maintained during the springing operation is desirably maintained as low as possible without congealing the mixture or increasing its viscosity to the point at which mixing becomes difficult. The upper sulfonic acid phase separating during the springing procedure is withdrawn, for example by decantation, while the lower dilute spent acid phase, after sufficient settling to allow droplets of sulfonic acid product usually suspended therein to settle by gravitation, is thereafter subjected to the treatment herein provided comprising the present invention. Dilution of the sulfonation reaction mixture with water in the springing procedure until the dilute acid phase contains less than 60% sulfuric acid is not generally preferred because of the tendency of the sulfonic acid phase separated previously to redissolve in the dilute aqueous solution.

In accordance with the process for recovery of residual sulfonic acids in the spent sulfonation acid phase as herein provided by the present invention, the latter acid phase is contacted with an extractive solvent characterized as being substantially insoluble in the aqueous acid phase and which selectively dissolves the residual sulfonic acids from said aqueous acid phase. The extractive solvent herein specified is a liquid capable of remaining in liquid state at the temperature and pressure conditions at which the extraction is effected or which may be liquefied at superatmospheric pressures maintained in the extraction vessel. Preferred solvents are the relatively volatile hydrocarbons and/or their halogenated derivatives, in general containing fewer than about 10 carbon atoms per molecule. By relatively volatile hydrocarbons it is meant those hydrocarbon compounds which are either normally gaseous and which may be vaporized at relatively low temperatures or those hydrocarbons having a relatively low boiling point such as for example, at temperatures below about 100° C. Of the utilizable hydrocarbon solvents, the non-benzenoid hydrocarbons are preferred, except when the aromatic charging stock is employed as extractant in accordance with the operation hereinafter described. The volatile hydrocarbon extractants are preferred over the less volatile hydrocarbons since they are more readily separated from the sulfonic acids extracted from the dilute spent acid phase by distillation, as for example, by reducing the pressure. Paraffinic hydrocarbons containing more than 2 and less than about 8 carbon atoms per molecule such as butane, pentane, hexane, etc. are most desirable, although ethane may also be employed when temperature and pressure conditions are maintained at such values that the said latter hydrocarbon is maintained in liquid phase. Olefins, particularly iso-olefins, are not a preferred class of hydrocarbon solvents utilizable herein, although at low extraction temperatures (that is below about 30° C.) these may also be utilized, especially when admixed with paraffinic hydrocarbons. Other classes of extractive solvents herein applicable to the present process are the halogenated, that is, fluorinated, chlorinated and brominated hydrocarbon analogs of the above classes of hydrocarbons, especially the low molecular weight hydrocarbon analogs containing fewer than about 8 carbon atoms per molecule. Representative compounds of the latter class of halogenated hydrocarbons are for example chloroform, carbontetrachloride, dichloroethane, perfluorobutane, dibromopropane, etc. It is generally preferred to employ the readily vaporizable extractants herein because of the ease of removing said extractant from the extracted sulfonic acids following the separation of the extract and raffinate phases by merely reducing the pressure and/or increasing the temperature at relatively low temperatures. Thus, one of the preferred extractants is liquefied propane which is maintained in liquid condition during the extraction stage of the process by maintaining a superatmospheric pressure in the extraction vessel. Following the separation of the extract phase containing the dissolved residual sulfonic acids extracted from the spent sulfuric acid phase from the raffinate phase, the extractant is allowed to evaporate from the extract phase by reducing the pressure, leaving the extracted sulfonic acids as a residue after complete evaporation of the extractant.

One of the especially preferred procedures in operating the present process when a liquid hydrocarbon is being subjected to sulfonation is represented by the particular flow wherein the fresh hydrocarbon charging stock to be sulfonated is supplied to the extraction vessel in liquid phase as the extractant therein. The hydrocarbon feed contacts the dilute spent sulfuric acid phase recovered from the prior springing stage of the process, extracts the sulfonic acids contained in the dilute acid and is thereafter diverted into the sulfonation reactor carrying dissolved therein the extracted sulfonic acids. The method provides a convenient unitary process for not only recovering the sulfonic acids but further enables the said sulfonic acids to be recovered without resorting to additional equipment or processing procedure to do so. Since the hydrocarbon feed or charging stock provides an excellent species of hydrocarbon extractant in that it is generally capable of removing substantially all of the residual sulfonic acid product from the dilute spent acid phase, the flow provided thereby presents a highly desirable method of recovering the sulfonic acids present in the dilute acid phase. The extracted sulfonic acids introduced with the feed in the sulfonation reactor remain essentially intact throughout the sulfonation reaction and are precipitated along with the other sulfonic acids formed during the sulfonation of the hydrocarbon feed when the sulfonation reaction mixture is diluted with water in the subsequent springing stage of the process.

Extraction of the dilute spent sulfuric acid phase produced in the springing stage of the process is effected at extractant aqueous acid phase ratios of from about 0.1 to about 5 on a volumetric basis, the preferred ratios being from about 1:1 to about 2:1. The temperature and pressure conditions during extraction are maintained at such values as will provide essentially liquid phase conditions, below about 100° C., preferably below about 50° C. and above the congealing point of the mixture which may be as low as —20° C.

The sulfonic acids recovered by extraction and retained by the extract phase in solution with the extractant may be recovered therefrom by various means. Thus, the hydrocarbon extractant may be evaporated from the extracted sulfonic acid as increased temperatures and/or reduced pressures, leaving a residue of the latter product. The sulfonic acid may also be recovered by a counter extraction with a different solvent, such as water, preferably a dilute aqueous caustic solution or another aqueous alkaline material such as a water solution of ammonia or an amine, the resulting sulfonate salt being recovered from solution by evaporation of the water. The vaporized or extracted solvent, following the removal of the sulfonic acids therefrom, may be subsequently recycled to the extraction vessel, as desired.

The extraction procedure of the present invention is a liquid-liquid system preferably effected under continuous countercurrent flow conditions, although a batch type process may be preferred under other operating conditions. In a typical batch process the spent sulfuric acid separated in the prior springing stage of the process is merely stirred or otherwise intimately contacted with the desired quantity of extractant and the two-phase system formed thereby allowed to settle, followed by decantation and recovery of the extracted sulfonic acids from the extractant in the upper extract phase. In the preferred continuous method of operation, the extractant is allowed to flow upwardly (usually having a lower specific gravity than the aqueous sulfuric acid phase) against a countercurrent flow of the dilute acid phase, effected, for example, in an extraction tower which may contain a packing material such as Berl saddles, quartz chips or other irregularly shaped pieces of contacting material to effect more intimate contact between the two phases in the extraction tower.

A continuous method of operation utilizing a dual solvent, one of which is the hydrocarbon charging stock to the sulfonation reactor and the other an auxiliary solvent which contacts the effluent raffinate from the preceding extraction in which the hydrocarbon feed is contacted with the dilute acid phase is illustrated in the accompanying diagram. The diagram further illustrates the flow in the prior sulfonation and springing stages of the process and is described with particular references to a hydrocarbon feed comprising alkyl aromatic hydrocarbons, such as an alkyl toluene hydrocarbon in which the alkyl group contains from about 9 to about 18 carbon atoms per group. The present process is especially adapted to the sulfonation of the above type of charging stock which upon sulfonation forms a detergent compound which is quite soluble in water and a significant portion of which tends to remain dissolved in the dilute spent sulfuric acid phase following the springing stage of the process.

Referring to the diagram, a sulfonating agent such as an oleum containing, for example, 20% free sulfur trioxide is introduced into sulfonation zone 1 through line 2 and contacts the alkyl aromatic hydrocarbon feed in said zone 1 at selected sulfonation conditions. The hydrocarbon feed comprising alkyl aromatic hydrocarbons and containing extracted sulfonic acids from the prior extraction stage as hereinafter more fully described, is introduced into zone 1 through line 3 and is sulfonated therein by the sulfonating agent at temperatures of from about −10° to about 30° C. Sulfonation in zone 1 is enhanced by a stirring device or other means of agitating the respective phases present therein. Following the required period of contact, usually after a reaction period of from about 10 to about 30 minutes, the entire sulfonation reaction product is withdrawn from zone 1 through line 4 and introduced into springing zone 5. As the sulfonation reaction mixture flows through line 4 it is admixed with water introduced into line 4 through line 6 in sufficient amounts to form a dilute sulfuric acid phase containing about 75% sulfuric acid which forms on the addition of said water to the sulfonation reaction mixture. The two-phase system which forms as a result of the afore described springing operation is allowed to settle by remaining quiescent in zone 5 until said phases have separated into an upper layer comprising chiefly sulfonic acid product and a lower layer comprising aqueous spent sulfuric acid containing a small but significant quantity of residual sulfonic acids which fail to separate from the dilute spent acid phase during the springing operation. The upper sulfonic acid phase is withdrawn from springing zone 5 through line 13 and diverted for further processing, as for example neutralization. The lower dilute sulfuric acid phase is withdrawn from zone 5 through line 7 and charged into the top of extraction zone 8 wherein it countercurrently contacts a liquid extractant comprising fresh hydrocarbon feed introduced into said extraction zone 8 at a point below the incoming line introducing the dilute spent sulfuric acid phase into zone 8. The fresh hydrocarbon feed or charging stock, also acting as the primary extractant in the present process, introduced through line 9, flows upwardly through the extraction column, countercurrently contacting the dilute sulfuric acid phase and extracting therefrom the residual sulfonic acids. The extract phase is removed from a point near the top of extraction zone 8 through line 3 and is charged to sulfonation zone 1 as hereinabove described.

In the present process a dual solvent is employed, the secondary solvent comprising liquefied butane which is contacted with the dilute sulfuric acid raffinate after said acid phase has been extracted with the primary solvent comprising fresh hydrocarbon feed. For this purpose, said liquefied butane may be introduced into extraction zone 8 through line 10 at a point below line 9 through which the hydrocarbon charging stock is fed into the extraction tower. The butane removes any additional amounts of sulfonic acids which have failed to dissolve in the hydrocarbon charging stock along with any hydrocarbon feed taken up by the aqueous acid phase and ultimately combines with the latter extractant at the top of extraction zone 8 and is charged along with the fresh hydrocarbon feed into sulfonation zone 1 through line 3. The butane serves a significant purpose not only in extraction zone 8 but in sulfonation zone 1 as well in that it acts as an internal refrigerant and diluent in said zone 1. The butane which resists sulfonation in zone 1 may be removed from the latter zone by evaporation as the exothermic heat of the sulfonation reaction is liberated; the vaporized butane exiting sulfonation zone 1 through line 11 may be liquefied by auxiliary condensing or refrigerating equipment, not shown on the diagram, and charged as recycle liquid butane through line 11 which connects with line 10 and is thereby introduced into the bottom of extraction zone 8. The extracted aqueous sulfuric acid raffinate which percolates downwardly through extraction zone 8 countercurrent to the rising stream of extractant is ultimately removed from zone 8 through line 12 and may be diverted, if desired, to a subsequent reconcentration process, involving, for example, evaporation of water therefrom in equipment not illustrated on the accompanying diagram.

The process of this invention is further illustrated by reference to the following example containing an application of the process to a specific charging stock and operated at specially selected conditions of operation. In thus citing an illustration, it is not intended to limit the generally broad aspects of the invention in accordance with the conditions or charging stocks specified therein.

An alkyl toluene hydrocarbon in which the alkyl group contains from about 9 to about 15 carbon atoms per alkyl group formed by the alkylation of toluene in the presence of substantially anhydrous hydrogen fluoride with an olefinic hydrocarbon fraction boiling from about 170° to about 240° C. containing olefinic hydrocarbons having from about 9 to about 15 carbon atoms per molecule derived from a cracked gasoline product was sulfonated in accordance with the following procedure. The features of the present invention are embodied in the stage of the process following the springing step wherein the dilute aqueous sulfuric acid phase recovered from the sulfonation reaction mixture is extracted with an extractive solvent as hereinafter indicated. The neutralized sulfonic acid product or its alkali metal salt is a highly effective detergent, especially when composited with a so-called "builder" salt such as sodium sulfate, sodium silicate, sodium chloride, etc.

The alkyl toluene product of the alkylation reaction having a boiling point of from about 270° to about 345° C. is charged into a sulfonation reactor comprising a stirred pressure autoclave followed by the addition thereto of the extract phase recovered from an extraction treatment of a prior sulfonation reaction mixture as hereinafter formed and consisting of liquefied n-butane containing dissolved sulfonic acids recovered by said previous extraction. The n-butane having a boiling point of about 0° C. provides a convenient internal coolant (by evaporation thereof as the temperature of sulfonation exceeds a previously determined desirable maximum fixed by the ambient pressure within the autoclave). The butane furthermore acts as a diluent of the reaction mixture and overcomes the high viscosities of the charging stock and reaction product at the relatively low sulfonation temperature.

Following the addition of the hydrocarbons to the sulfonation reactor, the sulfonating agent, a 30% oleum, is introduced into the reactor gradually as the n-butane is permitted to reflux until 1.8 mols of total sulfuric acid (the sum of the sulfuric acid present in the oleum and the sulfuric acid equivalent of the free sulfur trioxide in the oleum) has been added to the reactor. The temperature is maintained at from about 0° to about 10° C. during the sulfonation by maintaining the pressure at approximately 1 atmosphere. The mixture is stirred an additional ½ hour and then increased in temperature sufficiently to evaporate the n-butane therefrom. The butane vapors are condensed and recirculated as liquid butane to the extraction zone as provided in the subsequent stages of the process.

The sulfonation reaction mixture comprising sulfonic acids and excess sulfonating agent in a homogeneous one-phase mixture is then diluted with ice until a second phase appears. The second phase, consisting of diluted aqueous sulfuric acid and some sulfonic acids, contains 19.0 weight per cent water, 79.3 weight per cent sulfuric acid and 1.7 weight per cent sulfonic acids when phase separation begins. Additional water is added until the concentration of sulfuric acid in the aqueous phase is 73.5 weight per cent; the corresponding content of sulfonic acids therein at this dilution is 1.09. At a dilution corresponding to 61.5 per cent sulfuric acid, the sulfonic acid content is 0.66 weight per cent. At a dilution of acid corresponding to 27.9 weight per cent sulfuric acid, the sulfonic acid content is 12.7 weight per cent.

The dilute aqueous sulfuric acid containing 61.5% sulfuric acid and 0.66 weight per cent residual sulfonic acids not released therefrom in the springing step is transferred to a countercurrent extraction column containing Berl saddles as packing material and as the dilute acid is introduced into the top of the extraction column, liquefied butane at a pressure of 10 atmospheres is charged into the bottom of the column. The butane/dilute aqueous acid ratio is maintained at about 2.5 to 1. The effluent raffinate phase (aqueous acid) from the extraction column contains less than 0.1 weight per cent sulfonic acids as compared to a concentration of 0.66 weight per cent thereof in the charge subjected to extraction.

I claim as my invention:

1. In a sulfonation process wherein the charging stock to be sulfonated is contacted with a sulfonating agent and the resulting sulfonation reaction mixture containing the sulfonic acid product admixed with the sulfonating agent is diluted with water to spring the sulfonic acid product from said sulfonation reaction mixture, thereby forming a sulfonic acids product phase and an aqueous sulfuric acid phase containing residual sulfonic acids, the additional treatment of the aqueous sulfuric acid phase to extract residual sulfonic acids therefrom which comprises contacting said aqueous sulfuric acid phase with a water-insoluble solvent for said sulfonic acids selected from the group consisting of the hydrocarbons and halogenated hydrocarbons liquefiable at the temperature and pressure conditions of extraction.

2. In a sulfonation process wherein the charging stock to be sulfonated is contacted with a sulfonating agent and the resulting sulfonation reaction mixture containing the sulfonic acid product admixed with the sulfonating agent is diluted with water to spring the sulfonic acid product from said sulfonation reaction mixture, thereby forming a sulfonic acids product phase and an aqueous sulfuric acid phase containing residual sulfonic acids, the additional treatment of the aqueous sulfuric acid phase to extract residual sulfonic acids therefrom which comprises contacting said aqueous sulfuric acid phase with liquefied propane.

3. In a sulfonation process wherein an alkyl aromatic hydrocarbon charging stock to be sulfonated is contacted with a sulfonating agent and the resulting sulfonation reaction mixture containing the sulfonic acid derivative of said alkyl aromatic hydrocarbon admixed with the sulfonating agent is diluted with water to spring said sulfonic acid product from said sulfonation reaction mixture, thereby forming an alkyl aromatic sulfonic acids product phase and an aqueous sulfuric acid phase containing residual sulfonic acids, the additional treatment of the aqueous sulfuric acid phase to extract residual sulfonic acids therefrom which comprises contacting said aqueous sulfuric acid phase with liquid alkyl aromatic hydrocarbon charging stock to be sulfonated and charging the alkyl aromatic hydrocarbon charging stock containing extracted residual sulfonic acids to the sulfonation reaction.

4. In a sulfonation process wherein an alkyl aromatic hydrocarbon charging stock to be sulfonated is contacted with a sulfonating agent and the resulting sulfonation reaction mixture containing the sulfonic acid derivative of said alkyl aromatic hydrocarbon admixed with the sulfonating agent is diluted with water to spring said sulfonic acid product from said sulfonation reaction mixture, thereby forming an alkyl aromatic sulfonic acids product phase and an aqueous sulfuric acid phase containing residual sulfonic acids, the additional treatment of the aqueous sulfuric acid phase to extract residual sulfonic acids therefrom which comprises contacting said aqueous sulfuric acid phase with a primary solvent consisting of the alkyl aromatic hydrocarbon charging stock in an initial stage of the extraction, thereafter contacting the aqueous sulfuric acid phase from the initial extraction with a secondary solvent consisting of a paraffinic hydrocarbon containing at least two and less than 8 carbon atoms per molecule, combining the respective extract phases containing the primary and secondary solvents and charging said combined extract phases containing extracted residual sulfonic acids to the sulfonation reaction.

5. In a sulfonation process wherein an alkyl aromatic hydrocarbon charging stock to be sulfonated is contacted with a sulfonating agent and the resulting sulfonation reaction mixture containing the sulfonic acid derivative of said alkyl aromatic hydrocarbon admixed with the sulfonating agent is diluted with water to spring said sulfonic acid product from said sulfonation reaction mixture, thereby forming an alkyl aromatic sulfonic acids product phase and an aqueous sulfuric acid phase containing residual sulfonic acids, the additional treatment of the aqueous sulfuric acid phase to extract residual sulfonic acids therefrom which comprises contacting said aqueous sulfuric acid phase with a primary solvent consisting of the alkyl aromatic hydrocarbon charging stock in an initial stage of the extraction, thereafter contacting the aqueous sulfuric acid phase from the initial extraction with a secondary solvent consisting of a halogenated hydrocarbon containing at least two and less than 8 carbon atoms per molecule, combining the respective extract phases containing the primary and secondary solvents and charging said combined extract phases containing extracted residual sulfonic acids to the sulfonation reaction.

6. The process of claim 4 further characterized in that said secondary solvent consists of a butane fraction.

7. In a sulfonation process wherein an alkyl aromatic hydrocarbon to be sulfonated is contacted with a sulfonating agent and the resulting sulfonation reaction mixture containing an alkyl aromatic sulfonic acid product admixed with the sulfonating agent is diluted with water to spring said sulfonic acid product from said sulfonation reaction mixture thereby forming a sulfonic acids product phase and an aqueous sulfuric acid phase containing a small amount of residual sulfonic acid product which fails to separate in the springing stage, the additional treatment of the aqueous sulfuric acid phase to extract said residual sulfonic acids therefrom which comprises contacting said aqueous sulfuric acid phase with a water-insoluble solvent for said sulfonic acids selected from the group consisting of the hydrocarbons and halogenated hydrocarbons liquefiable at the temperature and pressure conditions of extraction.

8. The process of claim 3 further characterized in that said alkyl aromatic hydrocarbon is an alkyl toluene hydrocarbon having an alkyl group containing from about 9 to about 18 carbon atoms.

9. In a sulfonation process wherein the charging stock to be sulfonated is contacted with a sulfonating agent and a resulting sulfonation reaction mixture containing the sulfonic acid product admixed with the sulfonating agent is diluted with water to spring the sulfonic acid product from said sulfonation reaction mixture, thereby forming a sulfonic acids product phase and an aqueous sulfuric acid phase containing residual sulfonic acids, the additional treatment of the aqueous sulfuric acid phase to extract residual sulfonic acids therefrom which comprises contacting said aqueous sulfuric acid phase with a liquid hydrocarbon solvent for said sulfonic acids.

10. The process of claim 1 further characterized in that said solvent comprises a liquefied normally gaseous hydrocarbon.

11. In a sulfonation process wherein a sulfonatable aromatic compound to be sulfonated is contacted with a sulfonating agent and the resulting sulfonation reaction mixture containing the sulfonic acid derivative of said aromatic compound admixed with said sulfonating agent is diluted with water to spring said sulfonic acid derivative from said sulfonation reaction mixture thereby forming a sulfonic acids product phase and an aqueous sulfuric acid phase containing a small amount of residual sulfonic acid product which fails to separate in the springing stage, the additional treatment of the aqueous sulfuric acid phase to extract said residual sulfonic acids therefrom which comprises contacting said aqueous sulfuric acid phase with a liquefied butane solvent.

JULIAN M. MAVITY.

REFERENCES CITED

The following references are of record in the file of this patent:

UNITED STATES PATENTS

| Number | Name | Date |
|---|---|---|
| 2,059,838 | Arveson | Nov. 3, 1936 |
| 2,111,548 | Berry | Mar. 22, 1938 |
| 2,166,502 | Millmore | July 18, 1939 |
| Re. 22,548 | Brandt | Sept. 26, 1944 |

OTHER REFERENCES

Morton, "Laboratory Technique in Organic Chemistry," McGraw Hill Book Co., New York, New York, 1938, pp. 195–198.